United States Patent
Young

(10) Patent No.: US 7,918,952 B1
(45) Date of Patent: Apr. 5, 2011

(54) PROCESS FOR TRANSFORMING HEADLINER

(76) Inventor: Gary Young, Lebanon, KY (US)

( * ) Notice: Subject to any disclaimer, the term of this patent is extended or adjusted under 35 U.S.C. 154(b) by 684 days.

(21) Appl. No.: 12/012,946

(22) Filed: Feb. 6, 2008

(51) Int. Cl.
D04H 1/54 (2006.01)

(52) U.S. Cl. .................. 156/62.2; 156/153; 264/126

(58) Field of Classification Search .................. 156/62.2, 156/62.4, 153; 264/37.28, 123, 126
See application file for complete search history.

(56) References Cited

U.S. PATENT DOCUMENTS

| | | | |
|---|---|---|---|
| 4,568,581 A * | 2/1986 | Peoples, Jr. .................. 428/36.1 | |
| 5,007,976 A | 4/1991 | Satterfield et al. | |
| 5,225,130 A | 7/1993 | Deiringer | |
| 5,660,908 A | 8/1997 | Kelman et al. | |
| 5,807,513 A | 9/1998 | Gebreselassie et al. | |
| 5,879,802 A | 3/1999 | Beard et al. | |
| 5,888,616 A | 3/1999 | Ang | |
| 5,976,295 A | 11/1999 | Ang | |
| 6,110,580 A | 8/2000 | Gebreselassie | |
| 6,159,882 A * | 12/2000 | Kean et al. .................. 442/411 |
| 6,322,658 B1 | 11/2001 | Byma et al. | |
| 6,576,176 B1 | 6/2003 | Gebreselassie et al. | |
| 7,744,143 B2 * | 6/2010 | Gladfelter et al. ........... 296/39.3 |

* cited by examiner

*Primary Examiner* — Michael A Tolin
(74) *Attorney, Agent, or Firm* — Kenneth F. Pearce

(57) ABSTRACT

A process for transforming unused motor vehicle headliner or headliner edges into a bonded composite that can be used in motor vehicles. Unused motor headliner or headliner edges are combined with binder to create a bondable mixture. The bondable mixture is exposed to heat causing the binder to melt to create the bonded composite.

18 Claims, 5 Drawing Sheets

90 — GRINDING DISCARDED HEADLINER CREATING GROUND HEADLINER

92 — SIFTING THE GROUND HEADLINER THROUGH A SIEVE AND DEPOSITING SIFTED GROUND HEADLINER ON A WEIGHT MEASURING CONVEYOR

94 — CREATING A SHAPEABLE MIXTURE BY CONTROLLING ADDITIONS OF A BINDER MIXTURE TO THE WEIGHT MEASURING CONVEYOR CARRYING THE SIFTED GROUND HEADLINER

96 — TRANSPORTING THE SHAPEABLE MIXTURE TO A FORCED-AIR MIXING CHAMBER AND MIXING THE SHAPEABLE MIXTURE

98 — POSITIONING THE SHAPEABLE MIXTURE ONTO A FIRST SCRIM CARRIED BY A CONVEYOR

100 — APPLYING A FIRST HEAT AND A FIRST PRESSURE TO THE FIRST SCRIM AND THE SHAPEABLE MIXTURE TO CREATE A FIRST BONDED MIXTURE

102 — DEPOSITING A SECOND SCRIM ONTO THE UPPER SIDE OF THE FIRST BONDED MIXTURE

104 — APPLYING A SECOND HEAT AND A SECOND PRESSURE TO THE FIRST SCRIM, THE SECOND SCRIM, AND THE FIRST BONDED MIXTURE TO CREATE A SECOND BONDED MIXTURE

106 — ALLOWING THE SECOND BONDED MIXTURE TO COOL TO CREATE A RIGID BONDED COMPOSITE

FIGURE 3

140 — MAKING A THERMAL BINDER BY BLENDING A FIRST COMBINATION OF POLYESTER/POLYETHYLENE FIBERS WITH A SPECIFIC GRAVITY OF FROM ABOUT $0.91 G/CM^3$ TO ABOUT $0.97 G/CM^3$ AND MELTING POINTS FROM ABOUT 175°C TO ABOUT 250°C SUCH THAT THE FIRST COMBINATION CONSTITUTES FROM ABOUT 30% W/W TO ABOUT 70% W/W OF THE THERMAL BINDER AND BLENDING A SECOND COMBINATION OF POLYPROPYLENE/POLYETHYLENE FIBERS WITH A SPECIFIC GRAVITY OF FROM ABOUT $0.92 G/CM^3$ TO ABOUT $0.94 G/CM^3$ AND MELTING POINTS FROM 175° C TO ABOUT 250° C SUCH THAT THE SECOND COMBINATION CONSTITUTES FROM ABOUT 30% W/W TO ABOUT 70% W/W OF THE THERMAL BINDER

142 — USING A FORCED-AIR MIXER TO MIX THE THERMAL BINDER AND SHREDDED HEADLINER TO CREATE A BONDABLE MIXTURE

144 — APPLYING HEAT TO THE BONDABLE MIXTURE TO MELT THE THERMAL BINDER

146 — ALLOWING THE BONDABLE MIXTURE TO COOL TO CREATE A RIGID AND SOLID USEABLE SUBSTANCE

FIGURE 5

PROCESS FOR TRANSFORMING HEADLINER

BACKGROUND OF THE INVENTION

1. Field of the Invention

Among other things, the present invention is related to a process for transforming unused motor vehicle headliner or headliner edges into a bonded composite that can be used in motor vehicles. Within the scope of the present process, unused motor headliner or headliner edges are ground or shredded and mixed with a binder to create a bondable mixture. The bondable mixture is exposed to heat causing the binder to melt. After the bondable mixture is allowed to cool, a rigid and solid bonded composite is created.

2. Description of the Previous Art

1) U.S. Pat. No. 5,807,513-Gebreselassie et al. enables a method of recycling trim components. Column 1 of the '513 patent reads, "The method of the invention comprises the steps of shredding the scrap material into fluff, forming a binder reagent from polyisocyanates or a mixture of polyisocyanates and polyols, combining the fluff with the binder reagent and water to form a pre-preg mixture, the pre-preg mixture is then formed into pre-preg sheets, the pre-preg sheets are then compression molded at elevated temperatures into a variety of trim panels for use in a vehicle. The invention also permits a decorative coverstock to be applied to the panel as the panel is being molded thus eliminating a further manufacturing step." Among other things, Applicant's process does not teach the addition of the addition of water and polyisocynates required by the '513 patent. Gebreselassie does not utilize the first and second scrims as practiced by Applicant's product by process.

2) U.S. Pat. No. 6,110,580-Gebreselassie enables a method of recycling trim components for vehicles and is a division of U.S. Pat. No. 5,807,513. The '580 patent requires addition of water, polyisocynates and polyols. Among other things, Applicant's process does not teach the addition of the addition of water, polyisocynates and polyols required by the '580 patent. Gebreselassie does not utilize the first and second scrims as practiced by Applicant's product by process.

3) U.S. Pat. No. 6,576,176-Gebreselassie, et al. enables a method of recycling scrap material containing a thermoplastic. Column 3, line 59 through Column 4, line 6 read, "Optionally, during mixing, the fluff may be combined with a suitable binder to aid in providing a pre-preg mixture. The binder is capable of remaining in a pre-polymerized state for a reasonable time to allow for handling of the pre-preg sheet. Additionally, the binder is capable of curing under production compression molding cycles of 15 to 60 seconds at 100 to 250 degree Celsius with no post curing. Suitable binders include polyisocyanates, polyisocyanates mixed with polyols, and quasi-prepolymers or semi-prepolymers, which are products of isocyanates and polyols having an excess of free isocyanate. Particularly effective polyisocyanates include polymethylene-polyphenyl-polyisocyanate (PMDI); 4,4'-diphenylmethane diisocyanate (MDI); 2,4- and 2,6-toluene-diisocyanate (TDI); or naphthalene-diisocyanate (NDI)."

Among other things, Applicant's process does not teach the use of use of polyisocyanates, polyisocyanates mixed with polyols, and quasi-prepolymers or semi-prepolymers, which are products of isocyanates and polyols having an excess of free isocyanate binders. Applicant's process utilizes meltable synthetic fibers such as polyester, polyethylene and/or polypropylene combination as a binder.

4) U.S. Pat. No. 5,888,616-Ang enables a vehicle interior component formed from recyclable plastics material and the recycling of headliner. Columns 4 and 5 of the '616 patent read, "FIG. 7 diagrammatically illustrates the recycling of headliners 10 after completion of service life in a vehicle. In FIG. 7 automated material handling and cutting and grinding equipment 70 cuts or separates the headliner into particles. The particles are pumped or otherwise conveyed into the partially cleaning and separating station 72 which includes a series of cyclone separators 74 which separates foreign matter from the particles. Washed and separated particles of headliner material are then supplied to drying station 76 where they are dried using a suitable heat source. The particles of the headliner are then sent to station 80 for conversion by methanolysis into raw material 82 for fiber production that may be used for other headliner cores. The other suitable process particles of the headliner can also be sent to extruding, filtering and pelletizing equipment 78 and 84, which converts the particles into glass filled injectable moldable resins that are usable for other components or plastics articles."

Unlike the Ang recycling process that breaks down used headliner into raw material that is used to produce fibers, Applicant's process does not break down headliner into raw material to produce fibers.

5) U.S. Pat. No. 5,976,295-Ang enables a method of molding a recyclable muli-layer component from plastics material and is a division of U.S. Pat. No. 5,888,616. The identical process for breaking down used headliner into raw material enabled in the '616 patent is also enabled in by the '295 patent.

6) U.S. Pat. No. 5,879,802-Beard, et al. enables vehicle panel material. Column 3 of the '802 patent reads, "In FIG. 5, recycled thermo-formable material, such as waste fibers from carpet manufacturing is employed. The fiber density can be from 1-10 denier and be made of polypropylene, polyethylene, nylon or PET. This material is employed as shown by block 40 and is shredded into strips of about 1½-2 in length depending on the material being recycled. This step is indicated by the shredding step of block 42 utilizing a commercially available shredding machine. At the same time, a supply of scrap or waste headliner material is employed as indicated by block 50 and is stretched and separated into strips by pairs of rollers having needle-like projections as indicated by the step of block 52. The somewhat similar size and shapes of the thermo-formable material and headliner material are mixed and carded in a carding machine and process as indicated by block 45 to form a mat, as indicated by block 46, of, in the preferred embodiment, a mixture of about 50% reground thermo-formable material and about 50% of reprocessed headliner material. The thermo-formable material serves as a binder for the glass fibers of the headliner material and the blend of thermo-formable material and headliner material can vary from about 40-60%, respectively, to about 60-40%, respectively."

Among other things, Applicant's process does not utilize a thermosetting resin to bond the shredded headliner. Additionally, Applicant's novel and nonobvious binder comprises no more than 30% w/v of the finished product rather than 40-60% of the finished product as mandated by Beard.

7) U.S. Pat. No. 5,007,976-Satterfield, et al. enables a method of making a headliner. The Satterfield patent is silent regarding the transformation of preformed headliners into useable compositions.

8) U.S. Pat. No. 5,225,130-Deiringer enables a process for reclaiming thermally strained polyester scrap material. The '130 patent teaches that polyester waste materials are shredded, melted to form a molten material and that the molten material is filtered down to particle sizes from about 5 to 10 microns. Among other things, Applicant's process does not utilize this combination of steps or molten material that is filtered down to particle sizes of 5 to 10 microns.

9) U.S. Pat. No. 5,660,908-Kelman, et al. enables a recyclable automotive headliner and method of manufacture. Column 1 of the '908 patent reads, "This invention relates to an automotive headliner and, more particularly, to a recyclable headliner comprised of 100% polyethylene terephthalate (PET) material and its method of manufacture. The headliner of the present invention is made 100% from PET material capable of recycling by processes such as set forth in U.S. Pat. No. 5,225,130. While the '130 patent describes a process for reclaiming scrap PET material it does not disclose or suggest a solution of how to provide a headliner of a 100% PET material that will have desired strength properties."

The Kelman patent does not disclose any steps for recycling headliner other than those identified in the 5,225,130-Deiringer, and Deiringer appears to be limited to the process of shredding, purifying and sorting polyester scrap such that the scap is used to produce high quality polyethylene terephthalate.

10) U.S. Pat. No. 6,332,658-Byma, et al. enables a method for making a composite headliner. Byma does not disclose any steps for transforming preformed headliner into a useable composition.

SUMMARY OF THE INVENTION

The present process relates to the transformation of used or unused headliner into useable rigid and solid substances that can be incorporated into motor vehicles. In the art, headliner is fitted to the inner side of the dome of the passenger compartment. Currently available headliners include a combination of woven fabric, foam, foam and adhesive, and these headliner components are incorporated into the current process to manufacture the finished product.

Headliners are designed and molded for specific models of motor vehicles, i.e., different models require different headliners. Before installing the new and finished headliner in the motor vehicle passenger compartment, the headliner is cut away from the molded headliner. The cutting away of the finished headliner leaves leftover headliner edges, which prior to the current process, were discarded in a landfill. The current process allows previously unused headliner edges and well as headliner from junked motor vehicles to be recycled for use in a new motor vehicle. Thus, the current process meets the long felt but unfulfilled need of transforming unused headliner and headliner edges into useable component for a motor vehicle.

An aspect of the present process is to transform previously unused headliner or headliner edges into useable components for a motor vehicle.

It is another aspect of the present process to create rigid and solid bonded composite for use in a motor vehicle.

Yet another aspect of the present process is to decrease the quantity of waste associated with the manufacture of a motor vehicle that is deposited in a landfill.

Still another aspect of the present process is to create a bonded composite having thickness from about 2 millimeters to about 5 millimeters.

Yet still another aspect of the present process is to create a bonded composite weighing from about 1 kilogram to about 3 kilograms per square meter of surface area of the bonded composite.

It is another aspect of the present process to create bonded composites that have different rigidities, where the rigidities are, in part, dependant on the concentration of binder utilized to manufacture the bonded composites.

An embodiment of the present invention can be described as a process of transforming unused molded headliner edges into a usable part of a vehicle; comprising the steps of: a) transporting the headliner edges to a grinder; b) grinding the headliner edges to create a mixture of headliner components and depositing the ground components on a weight measuring conveyor; c) controlling additions of a binder to the weight measuring conveyor carrying the ground components, wherein the binder comprises: i) a first blend of polyester/polyethylene fibers having a specific gravity of from about 0.91 $g/cm^3$ to about 0.97 $g/cm^3$ and comprising from about 30% w/w to about 70% w/w of the binder; and ii) a second blend of polypropylene/polyethylene fibers having a specific gravity of from about 0.92 $g/cm^3$ to about 0.94 $g/cm^3$ and comprising from about 30% w/w to about 70% w/w of the binder; d) mixing the binder and the ground components to create a bondable mixture such that the bondable mixture comprises from about 20% w/w to about 30% w/w of the binder; e) depositing the bondable mixture onto a polyester scrim carried by a conveyor, wherein the bondable mixture's depth is from about 25 millimeters to about 100 millimeters and the bondable mixture's width is from about 1.20 meters to about 2.45 meters; f) applying a first heat and a first pressure to the polyester scrim and the bondable mixture to create a first bonded mixture, wherein the first heat is in the range of about 175° C. to about 250° C.; g) depositing a polypropylene scrim onto an upper side of the first bonded mixture; h) applying a second heat and a second pressure to the polyester scrim, the polypropylene scrim and the first bonded mixture to create a second bonded mixture, wherein the second heat is in the range of about 175° C. to about 250° C.; and i) allowing the second bonded mixture to cool to create a rigid bonded composite having a thickness in the range of from about 2 millimeters to about 5 millimeters.

Yet another embodiment of the present invention can be described as a process for recycling discarded headliner; comprising the steps of: a) grinding the discarded headliner; b) sifting the ground headliner through a sieve having a mesh with diameters of from about 3 millimeters to about 5 millimeters and depositing the sifted and ground headliner on a weight measuring conveyor; c) creating a shapeable mixture by controlling additions of a binder mixture to the weight measuring conveyor carrying the sifted and ground headliner such that the binder mixture comprises from about 20% w/w to about 30% w/w of the shapeable mixture; d) transporting the shapeable mixture to a forced-air mixing chamber and mixing the sifted and ground headliner and the binder mixture; e) positioning the shapeable mixture onto a polyester scrim carried by a conveyor; f) applying a first heat and a first pressure to the polyester scrim and the shapeable mixture to create a first bonded mixture, wherein the first heat is in the range of about 175° C. to about 250° C.; g) depositing a polypropylene scrim onto an upper side of the first bonded mixture; h) applying a second heat and a second pressure to the polyester scrim, the polypropylene scrim and the first bonded mixture to create a second bonded mixture; and i) allowing the second bonded mixture to cool to create a rigid bonded composite having a thickness in the range of from about 2 millimeters to about 5 millimeters.

In still another embodiment, the present invention can be described as a process of transforming unused or recycled headliner in to a usable rigid component for a motor vehicle; comprising the steps of: a) grinding the headliner to create fluffy components; b) mixing the fluffy components with a composite binder to create a bondable mixture, wherein the bondable mixture comprises 30% w/w or less of the composite binder, and wherein the composite binder comprises: i) a first blend of polyester/polyethylene fibers having a specific gravity of from about 0.91 g/cm$^3$ to about 0.97 g/cm$^3$ and comprising from about 30% w/w to about 70% w/w of the binder; and ii) a second blend of polypropylene/polyethylene fibers having a specific gravity of from about 0.92 g/cm$^3$ to about 0.94 g/cm$^3$ and comprising from about 30% w/w to about 70% w/w of the binder; c) depositing the bondable mixture onto a first bondable layer; d) covering the bondable mixture with a second bondable layer; e) bonding the composite binder to the fluffy components and the first and second bondable; and f) allowing the melted composite binder, the fluffy components and the first and the second bondable layers to cool to create a rigid bonded composite for use in the motor vehicle.

In yet another embodiment, the present invention can be described as a process of transforming ground headliner into a rigid and solid usable substance; comprising the steps of: a) making a thermal binder by: i) blending a first combination of polyester/polyethylene fibers with a specific gravity of from about 0.91 g/cm$^3$ to about 0.97 g/cm$^3$ and melting points from about 175° C. to about 250° C. such that the first combination constitutes from about 30% w/w to about 70% w/w of the thermal binder; and ii) blending a second combination of polypropylene/polyethylene fibers with a specific gravity of from about 0.92 g/cm$^3$ to about 0.94 g/cm$^3$ and melting points from about 175° C. to about 250° C. such that the second combination constitutes from about 30% w/w to about 70% w/w of the thermal binder; b) using a forced-air mixer to mix the thermal binder and the ground headliner to create a bondable mixture; and c) applying heat to the bondable mixture to melt the thermal binder; and allowing the bondable mixture to cool, thereby creating the rigid solid usable substance.

It is the novel and unique interaction of these simple elements which creates the devices and methods within the ambit of the present invention. Pursuant to Title 35 of the United States Code, descriptions of preferred embodiments follow. However, it is to be understood that the best mode descriptions do not limit the scope of the present invention.

BRIEF DESCRIPTION OF THE DRAWINGS

FIG. 3 is a representation of an embodiment of the present process.

FIG. 5 is a representation of an embodiment of the present process.

DESCRIPTION OF THE PREFERRED EMBODIMENTS

Although the disclosure hereof is detailed to enable those skilled in the art to practice the invention, the embodiments published herein merely exemplify the present process for transforming motor vehicle headliner to uses other than headliner for motor vehicles.

Figure 1:
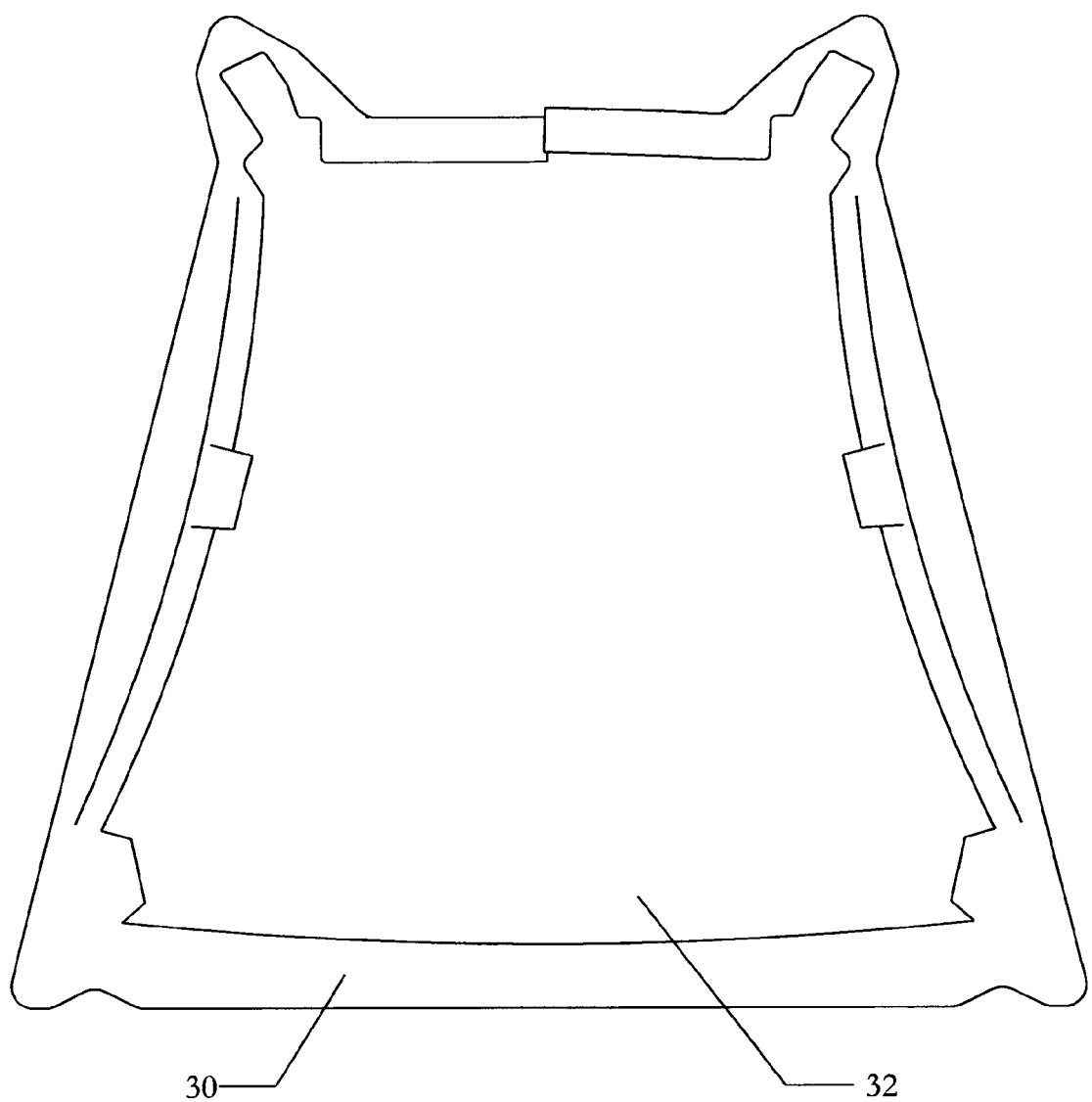
FIG. 1 is a perspective of headliner edges.

FIG. 1 is a perspective of headliner edges (30). Removal of the headliner (not shown) from the molded member leaves headliner edges (30) and opening (32). The headliner is secured to the dome of the motor vehicle's passenger compartment. Depending on the headliner selected for incorporation into a particular model of motor vehicle, the leftover headliner edges (30) can be of numerous dimensions.

In the motor vehicle industry, headliner and headliner edges generally include a combination of woven and non-woven fabrics, foam and adhesive components. The woven and nonwoven fabrics can include polyester or other synthetic or natural fibers. Adhesives utilized in forming the headliner can include polyolefins. Soft polyurethane foam is customarily used as a cushioning component of many currently utilized headliners. Select compositions of headliners can also include carbon or fiberglass components that increase rigidity of the headliners.

Figure 2:
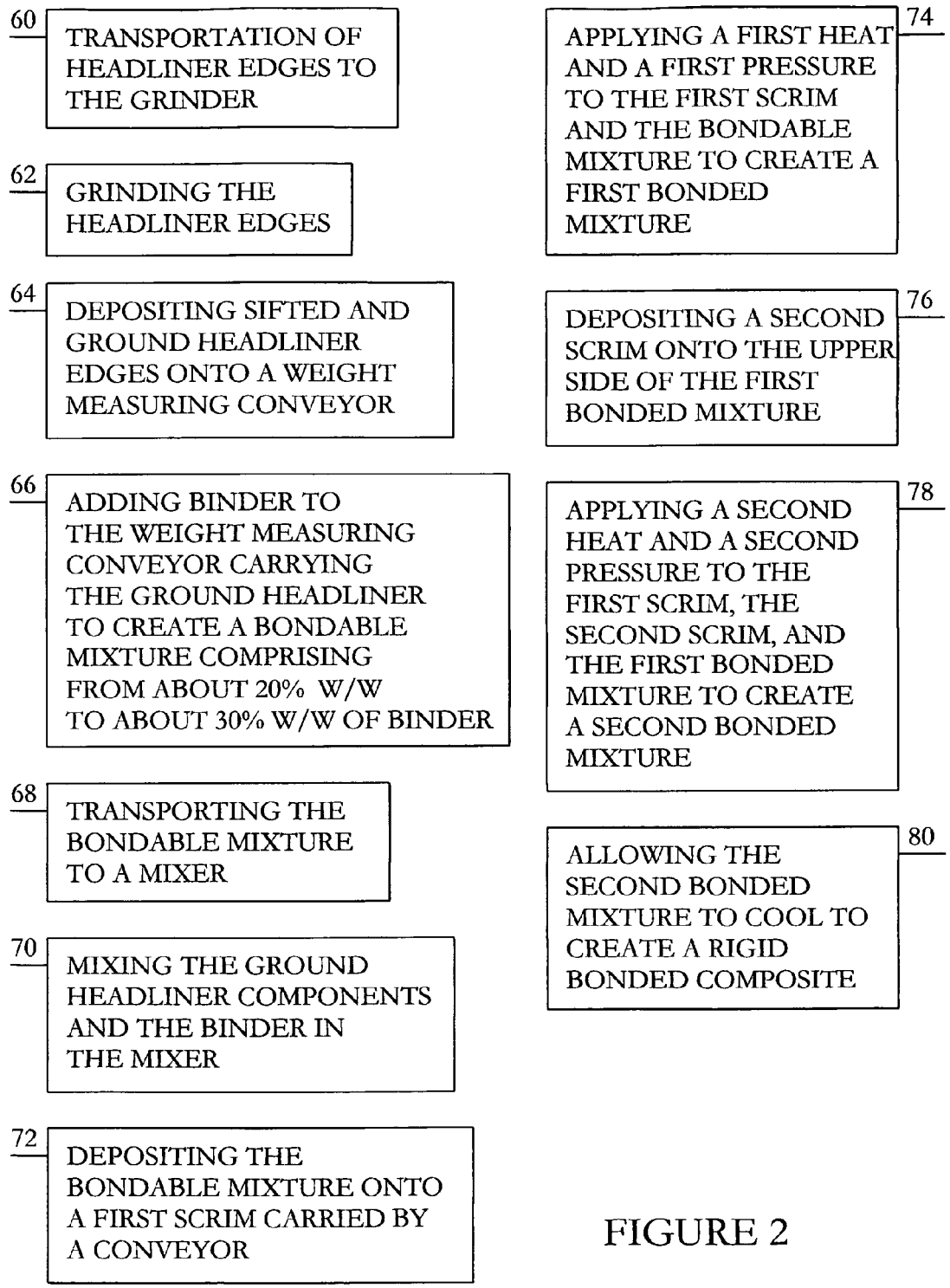
FIG. 2 is a representation of an embodiment of the current process.

FIG. 2 is a representation of an embodiment of the current process. The first step (60) of this embodiment includes collection and transportation of unused edges (30) to a grinder. After arrival at the grinder, the next step (62) of the current embodiment is to grind the unused edges (30). Grinding the unused edges (30) produces ground components of unused headliner having a volume of about 66 cubic millimeters or less. Unused edges (30) are continually ground until the ground edges can pass through a sieve having a mesh with diameters of from about 3 millimeters to about 5 millimeters. It has unexpectedly been discovered that ground components with volumes from about 14 cubic millimeters to about 65 cubic millimeters are preferred in the current embodiment of the present invention.

After sifting the ground components, in step (64), the ground headliner components are deposited onto weight measuring conveyor. In step (66), binder is added to the weight measuring conveyor carrying the ground components to create a bondable mixture comprising from about 20% w/w to about 30% w/w of binder. Additions of binder to the weight measuring conveyor are controlled in any manner acceptable in the art. Specifications of the desired finished product determine the percentage of binder mixed with the ground components, but select embodiments of the present process utilize bondable mixtures that have from about 20% w/w to about 30% w/w of binder and from about 70% w/w ground headliner components to about 80% w/w of ground headliner components.

Within the scope of the present method, binders have lower melting points than the majority of or all of the components of ground mixture. It has been discovered that the preferred binders of the current process are polymers of esters or alkenes.

A preferred binder for an embodiment of the current method is: a first blend of polyester/polyethylene fibers with a specific gravity of from about 0.91 g/cm$^3$ to about 0.97 g./cm$^3$ where the first blend comprises from about 30% w/w to about 70% w/w of the binder and a second blend of polypropylene/polyethylene fibers with a specific gravity of from about 0.92 g/cm$^3$ to about 0.94 g/cm$^3$ where the second blend comprises from about 30% w/w to about 70% w/w of the binder. Another preferred binder for an embodiment of the current method is: a first blend of polyester/polyethylene fibers with a specific gravity of from about 0.92 g/cm$^3$ to about 0.96 g/cm$^3$ where the first blend comprises from about 30% w/w to about 70% w/w of the binder and a second blend of polypropylene/polyethylene fibers with a specific gravity of from about 0.92 g/cm$^3$ to about 0.94 g/cm$^3$ where the second blend comprises from about 30% w/w to about 70% w/w of the binder. Still another preferred binder for an embodiment of the current method is: a first blend of polyester/polyethylene fibers with a specific gravity of from about 0.92 g/cm$^3$ to about 0.96 g/cm$^3$ where the first blend comprises from about 30% w/w to about 70% w/w of the binder and a second blend of polypropylene/polyethylene fibers with a specific gravity of about 0.93 g/cm³ where the second blend comprises from about 30% w/w to about 70% w/w of the binder.

In step (68) of the current embodiment, the bondable mixture is transported to a mixer. In step (70), the ground headliner components and the binder are mixed in the mixer. It has been discovered that forced-air mixers, and in particular, tornadic forced-air are the preferred mixers for processes of the current invention. Tornadic forced-air mixers evenly disperse the binder within the bondable mixture.

After the bondable mixture has been mixed, in step (72), the bondable mixture is deposited onto a first scrim carried by a conveyor. Scrims associated with the current process comprise polymers of esters or the alkenes with higher melting points than the binders. In the particular embodiment set forth in step (72), the preferred scrim is a polyester scrim that is carried by a conveyor. Select embodiments of the current process deposit the bondable mixture onto the scrim at a preselected width of from about 1.20 meters to about 2.45 meters and a preselected depth of from about 25 millimeters to about 100 millimeters.

In step (74), a first heat and a first pressure are applied to the bondable mixture to create a first bonded mixture. As the bondable mixture and the first scrim are heated, pressure rollers compress the depth of the bondable mixture such that the depth of the first bonded mixture is less than the depth of the bondable mixture. Within the scope of the current embodiment, oven generated temperatures from about 175° C. to about 250° C. are applied to the first scrim and the bondable mixture for sufficient time for some of the binder to melt. The combination of pressure and temperature catalyze the bonding of the first scrim and the bondable mixture.

In step (76), a second scrim is deposited onto the upper side of the first bonded mixture. A conveyor lays the second scrim onto the first bonded mixture. In this particular embodiment set forth in step (76), the preferred scrim is a polypropylene scrim. It has unexpectedly been discovered that application of the first scrim and the second scrim during different steps of the current embodiment limits wrinkling of the outward surfaces of the finished product.

In step (78), a second heat and a second pressure are applied to the first bonded mixture, the first scrim and the second scrim to create a second bonded mixture. As the first bonded mixture, the first scrim and the second scrim are heated, pressure rollers compress the depth of the first bond mixture such that the depth of the second bonded mixture is less than the depth of the first bonded mixture. Within the scope of the current embodiment, oven generated temperatures from about 175° C. to about 250° C. are applied to the first scrim, the second scrim and first bonded mixture for sufficient time for a majority of the binder to melt. The combination of pressure and temperature catalyze the bonding of the first scrim and the second scrim to the first bonded mixture.

Step (80) allows the second bonded mixture to cool such that a rigid bonded composite is created. Depending on preselected engineering parameters, the rigid bonded composite can have a thickness in the range of from about 2 millimeters to about 5 millimeters and can weigh from about 1 kilogram to about 3 kilograms per square meter of surface area.

FIG. 3 is a representation of an embodiment of the current process. A supply of discarded headliner is first procured. By way of illustration and not limitation, discarded headliner can include headliner edges, unused headliner or headliner that has been removed from motor vehicle compartments.

In step (90), the discarded headliner is ground in a grinder. Grinding the discarded headliner generates ground or shredded headliner pieces. Depending on predetermined grinding parameters, grinding of the headliner can produce fluffy headliner pieces.

Step (92) includes the sifting of the ground headliner pieces through a sieve having a mesh with diameters from about 3 millimeters to about 5 millimeters. After sifting, the sifted ground headliner pieces are deposited onto weight measuring conveyor. It has unexpected been discovered that ground headliner pieces with volumes from about 14 cubic millimeters to about 65 cubic millimeters are preferred in the current embodiment of the present invention.

In step (94), a binder mixture is added to the weight measuring conveyor carrying the ground components to create a shapeable mixture comprising from about 20% w/w to about 30% w/w of the binder mixture. Additions of the binder mixture to the weight measuring conveyor are controlled in any manner acceptable in the art. Specifications of the desired finished product determine the percentage of the binder mixture added to the ground components, but select embodiments of the present process utilize bondable mixtures that have from about 20% w/w to about 30% w/w of the binder mixture and from about 70% w/w to about 80% w/w of sifted and ground headliner pieces.

Within the scope of the current embodiment, binder mixtures have lower melting points than the majority of or all of the pieces of sifted and ground headliner. As previously indicated, preferred binder mixtures of the current process are polymers of esters or alkenes. Binder mixtures of the present process can include a combination of meltable synthetic fibers. And the meltable synthetic fibers can comprise a combination of polyester, polyethylene and/or polypropylene fibers.

A preferred binder mixer for an embodiment of the current embodiment is: a first group of polyester/polyethylene fibers with a specific gravity of from about 0.91 g/cm³ to about 0.97 g./cm³ where the first group comprises from about 30% w/w to about 70% w/w of the binder mixture and a second group of polypropylene/polyethylene fibers with a specific gravity of from about 0.92 g/cm³ to about 0.94 g/cm³ where the second group comprises from about 30% w/w to about 70% w/w of the binder mixture. Another preferred binder mixture for an embodiment of the current method is: a first group of polyester/polyethylene fibers with a specific gravity of from about 0.92 g/cm³ to about 0.96 g/cm³ where the first group comprises from about 30% w/w to about 70% w/w of the binder mixture and a second group of polypropylene/polyethylene fibers with a specific gravity of from about 0.92 g/cm³ to about 0.94 g/cm³ where the second group comprises from about 30% w/w to about 70% w/w of the binder mixture. Still another preferred binder mixture for an embodiment of the current method is: a first group of polyester/polyethylene fibers with a specific gravity of from about 0.92 g/cm³ to about 0.96 g/cm³ where the first group comprises from about 30% w/w to about 70% w/w of the binder mixture and a second group of polypropylene/polyethylene fibers with a specific gravity of about 0.93 g/cm³ where the second group comprises from about 30% w/w to about 70% w/w of the binder mixture.

In step (96), the shapeable mixture of ground headliner pieces and the binder mixture are transported to a forced-air mixing chamber and mixed. It has been discovered that forced-air mixing chambers, and in particular, tornadic forced-air mixing chambers are the preferred mixing chambers for processes of the current invention. Tornadic forced-air mixing chambers evenly disperse the binder mixture within the shapeable mixture.

After the shapeable mixture has been mixed, in step (98), the shapeable mixture is deposited onto a first scrim carried by a conveyor. Scrims associated with the current process comprise polymers of esters or the alkenes with higher melting points than the binder mixtures. In the particular embodiment set forth in step (98), the preferred scrim is a polyester scrim that is carried by a conveyor. Select embodiments of the current process deposit the shapeable mixture onto the scrim at a preselect width of from about 1.20 meters to about 2.45 meters and a depth of from about 25 millimeters to about 100 millimeters.

In step (100), a first heat and a first pressure are applied to the shapeable mixture to create a first bonded mixture. As the shapeable mixture and the first scrim are heated, pressure rollers compress the depth of the shapeable mixture such that the depth of the first bonded mixture is less than the depth of the shapeable mixture. Within the scope of the current embodiment, oven generated temperatures from about 175° C. to about 250° C. are applied to the first scrim and the shapeable mixture for sufficient time for some of the binder mixture to melt. The combination of pressure and temperature catalyze the bonding of the first scrim and the shapeable mixture.

In step (102), a second scrim is deposited onto the upper side of the first bonded mixture. A conveyor lays the second scrim onto the first bonded mixture. In this particular embodiment set forth in step (102), the preferred scrim is a polypropylene scrim. It has unexpectedly been discovered that application of the first scrim and the second scrim during different steps of the current embodiment limits wrinkling of the outward surfaces of the finished product—resulting in a more aesthetically pleasing finished product.

In step (104), a second heat and a second pressure are applied to the first bonded mixture, the first scrim and the second scrim to create a second bonded mixture. As the first bonded mixture, the first scrim and the second scrim are heated, pressure rollers compress the depth of the first bond mixture such that the depth of the second bonded mixture is less than the depth of the first bonded mixture. Within the scope of the current embodiment, oven generated temperatures from about 175° C. to about 250° C. are applied to the first scrim, the second scrim and first bonded mixture for sufficient time for a majority of the binder to melt. The combination of pressure and temperature catalyze the bonding of the first scrim and the second scrim to the first bonded mixture.

Step (106) allows the second bonded mixture to cool such that a rigid bonded composite is created. Depending on preselected engineering parameters, the rigid bonded composite can have a thickness in the range of from about 2 millimeters to about 5 millimeters and can weigh from about 1 kilogram to about 3 kilograms per square meter of surface area.

Figure 4:
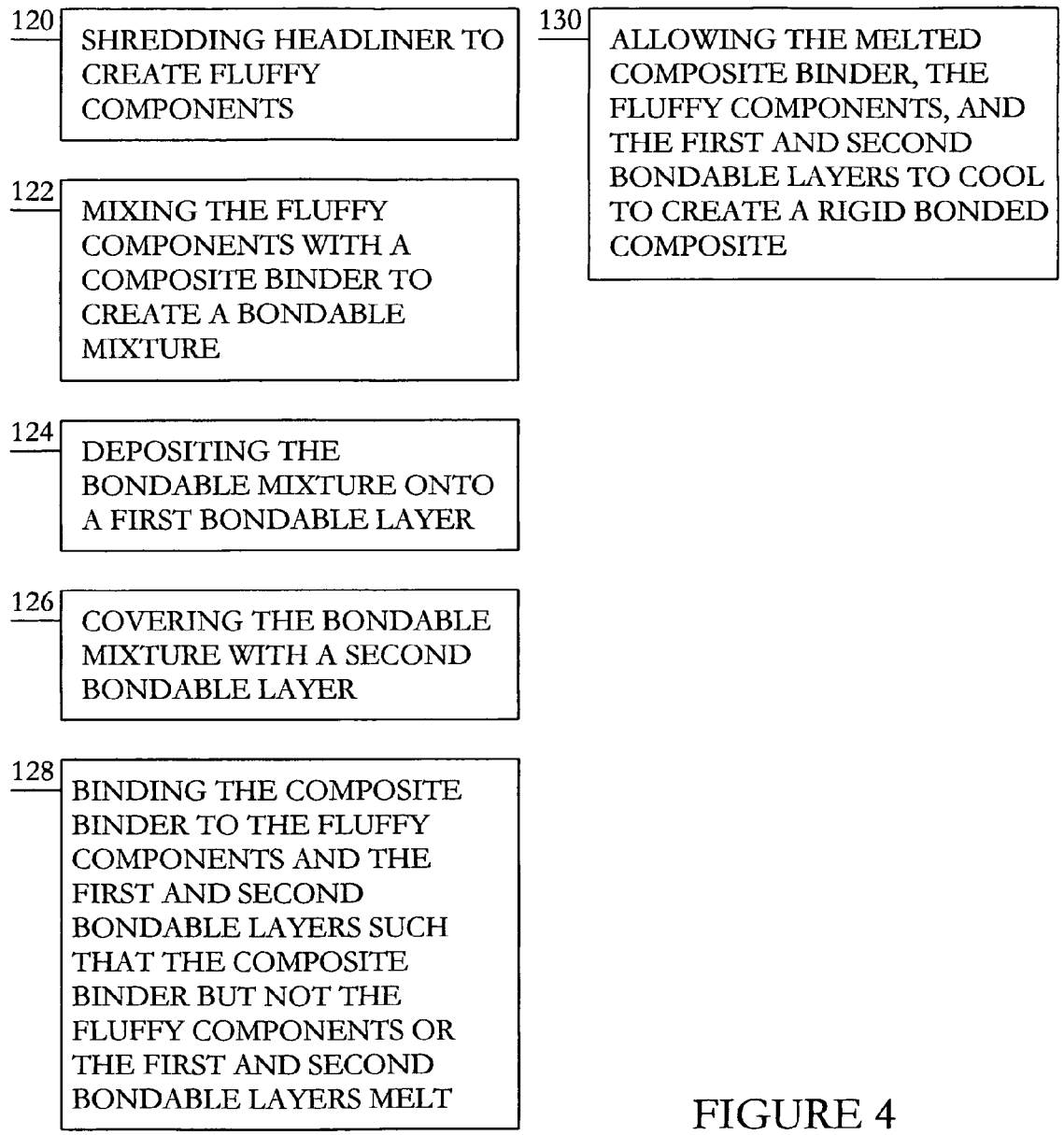
FIG. 4 is a representation of an embodiment of the current process.

FIG. 4 is a representation of an embodiment of the current process. A supply of unused or recycled headliner is transformed into a useable rigid component for a motor vehicle. Uses for the rigid component can include but are not limited to door ornaments, seat back supports, seat back stiffeners, sun visor substrates or spare tire covers.

In step (120), the headliner is ground to create fluffy components of unused and/or recycled headliner. Prior to mixing the fluffy components with the composite binder, the fluffy components can be sifted through a sieve that has a mesh with diameters from about 3 millimeters to about 5 millimeters. It has been discovered that forced-air mixers, and in particular, tornadic forced-air mixers are the preferred mixing chambers associated with the present process. For select embodiments, it has been discovered that the use of fluffy components with volumes from about 14 cubic millimeters to about 65 allows for easier mixing of the fluffy components with the composite binder.

In step (122), the fluffy components are mixed with the composite binder to create a bondable mixture. Input of fluffy components and composite binder are controlled to create a bondable mixture that has about 30% w/w or less of composite binder. More preferably, the composition of the bondable mixture is controlled to create a bondable mixture that has from about 20% w/w to about 30% w/w of the composite binder.

It has been discovered that the preferred composite binders of the current process are polymers of esters or alkenes. A preferred composite binder for an embodiment of the present process is: a first blend of polyester/polyethylene fibers with a specific gravity of from about 0.91 g/cm$^3$ to about 0.97 g./cm$^3$ where the first blend comprises from about 30% w/w to about 70% w/w of the composite binder and a second blend of polypropylene/polyethylene fibers with a specific gravity of from about 0.92 g/cm$^3$ to about 0.94 g/cm$^3$ where the second blend comprises from about 30% w/w to about 70% w/w of the composite binder. Another preferred composite binder for an embodiment of the present process is: a first blend of polyester/polyethylene fibers with a specific gravity of from about 0.92 g/cm$^3$ to about 0.96 g/cm$^3$ where the first blend comprises from about 30% w/w to about 70% w/w of the composite binder and a second blend of polypropylene/polyethylene fibers with a specific gravity of from about 0.92 g/cm$^3$ to about 0.94 g/cm$^3$ where the second blend comprises from about 30% w/w to about 70% w/w of the composite binder. Still another preferred composite binder for an embodiment of the present process is: a first blend of polyester/polyethylene fibers with a specific gravity of from about 0.92 g/cm$^3$ to about 0.96 g/cm$^3$ where the first blend comprises from about 30% w/w to about 70% w/w of the composite binder and a second blend of polypropylene/polyethylene fibers with a specific gravity of about 0.93 g/cm$^3$ where the second blend comprises from about 30% w/w to about 70% w/w of the composite binder.

In step (124), the bondable mixture is deposited onto a first bondable layer. More specifically, the deposited bondable mixture is deposited onto the first bondable layer, generally carried by a conveyor, to a preselected width and depth. In step (126), the bondable mixture is covered with a second bondable layer. Within the scope of the present embodiment, the first and second bondable layers can be polyesters or polypropylenes.

In step (128), the composite binder, the fluffy components and the first and second bondable layers are bonded together, where the composite binder but not the fluffy components or the first and second bondable layers melt. It has been unexpectedly discovered that the preferred temperature ranges for melting the composite binder are from about 175° C. to about 250° C. Melting of the composite binder causes both the first and second bondable layers to bind to the bondable mixture.

For select embodiments of the current process, the second bondable layer is added to the upper surface of the bondable mixture subsequent to a least a partial melting of the composite binder that binds the bondable mixture to the first bondable layer. Select embodiments can also practice the application of a first heat and a first pressure to the bondable mixture and the first bondable layer as well as a second heat and a second pressure to the bondable mixture, the first bondable layer and the second bondable layer. In accordance with the present embodiments, the first and second applications of heat may be of identical or different temperatures. Similarly, the first and second applications of pressure can be of identical or different pressures. One or more ovens can be utilized to generate heat and one or more pressure rolls can be used to apply pressure to the bondable mixture and one or both of the bondable layers.

In step (130), the melted composite binder, the fluffy components and the first and second bondable layers are allowed to cool to create a rigid bonded composite. Depending on preselected engineering parameters, the rigid bonded composite can have a thickness in the range of from about 2 millimeters to about 5 millimeters and can weigh from about 1 kilogram to about 3 kilograms per square meter of surface area of the rigid bonded composite.

FIG. 5 is a representation of an embodiment of the current process. Shredded headliner is transformed into a rigid and solid usable substance. Uses of the rigid and solid usable substance are generally associated with motor vehicles. By way of illustration, the rigid and solid usable substance can be used in the manufacture of door ornaments, seat back supports, seat back stiffeners, sun visor substrates or spare tire covers.

In step (140), a thermal binder is made by blending a first combination of polyester/polyethylene fibers with a specific gravity of from about 0.91 g/cm$^3$ to about 0.97 g/cm$^3$ and melting points from about 175° C. to about 250° C. such that the first combination constitutes from about 30% w/w to about 70% w/w of the thermal binder and blending a second combination of polypropylene/polyethylene fibers with a specific gravity of from about 0.92 g/cm$^3$ to about 0.94 g/cm$^3$ and melting points from about 175° C. to about 250° C. such that the second combination constitutes from about 30% w/w to about 70% w/w of the thermal binder.

In step (142), a forced-air mixer mixes the thermal binder with ground headliner to create a bondable mixture. In select embodiments, mixing of the thermal binder and the shredded headliner is controlled to create a bondable mixture containing about 30% w/w or less of the thermal binder while the mixing of the thermal binder and the shredded headliner is monitored to create a bondable mixture containing from about 20% w/w to about 30% w/w of the thermal binder.

In step (144), heat is applied to the bondable mixture to melt an adequate amount of the thermal binder to bond the bondable mixture, and in step (146), the bondable mixture is allowed to cool to create the rigid and solid useable substance. For select embodiments, prior to the application of heat, the bondable mixture is deposited onto a first scrim, generally carried by a conveyor, and a second scrim is laid on top of the bondable mixture. Generally, scrims associated with the present process are composed of polyester or polypropylene.

For select embodiments of the current process, the second scrim is added to the upper surface of the bondable mixture subsequent to a least a partial melting of the thermal binder that binds the bondable mixture to the first scrim. Select embodiments can also practice the application of a first heat and a first pressure to the bondable mixture and the first scrim as well as a second heat and a second pressure to the bondable mixture, the first scrim and the second scrim. In accordance with the present embodiments, the first and second applications of heat may be of identical or different temperatures. Similarly, the first and second applications of pressure can be of identical or different pressures. One or more ovens can be utilized to generate heat and one or more pressure rolls can be used to apply pressure to the bondable mixture and one or both of the bondable layers. And depending on preselected engineering parameters, the rigid and solid useable substance can have a thickness in the range of from about 2 millimeters to about 5 millimeters and can weigh from about 1 kilogram to about 3 kilograms per square meter of surface area.

Having disclosed the invention as required by Title 35 of the United States Code, Applicant now prays respectfully that Letters Patent be granted for his invention in accordance with the scope of the claims appended hereto.

What is claimed is:

1. A process of transforming ground headliner into a rigid and solid usable substance; comprising the steps of:
    a) making a thermal binder by:
        i) blending a first combination of polyester/polyethylene fibers with a specific gravity of from about 0.91 g/cm$^3$ to about 0.97 g/cm$^3$ and melting points from about 175° C. to about 250° C. such that said first combination constitutes from about 30% w/w to about 70% w/w of said thermal binder; and
        ii) blending a second combination of polypropylene/polyethylene fibers with a specific gravity of from about 0.92 g/cm$^3$ to about 0.94 g/cm$^3$ and melting points from about 175° C. to about 250° C. such that said second combination constitutes from about 30% w/w to about 70% w/w of said thermal binder;
    b) using a forced-air mixer to mix said thermal binder and said ground headliner to create a bondable mixture; and
    c) applying heat to said bondable mixture to melt said thermal binder; and allowing said bondable mixture to cool, thereby creating said rigid solid usable substance.

2. The process of claim 1, wherein said step of mixing said thermal binder and said ground headliner is controlled to cause said bondable mixture to comprise from about 20% w/w to about 30% w/w of said thermal binder.

3. The process of claim 2, wherein said step of applying heat to said bondable mixture to melt said thermal binder further comprises:
    a) depositing said bondable mixture onto a first scrim and applying a first portion of said heat and a first pressure to said bondable mixture and said first scrim;
    b) laying a second scrim on top of said bondable mixture, said first scrim and applying a second portion of said heat and a second pressure to said bondable mixture, said first scrim and said second scrim.

4. The process of claim 3, wherein said first portion of said heat and said second portion of said heat range from about 175° C. to about 250° C.

5. The process of claim 4, wherein said scrims comprise polyester or polypropylene.

6. The process of claim 5, wherein said solid usable substance comprises:
    a) a thickness in the range of from about 2 millimeters to about 5 millimeters; and
    b) weighs from about 1 kilogram to about 3 kilograms per square meter of surface area.

7. A process of transforming unused molded headliner edges into a usable part of a vehicle; comprising the steps of:
    a) transporting said headliner edges to a grinder;
    b) grinding said headliner edges to create a mixture of headliner components such that said ground components have a volume less than about 66 cubic millimeters and depositing said ground components on a weight measuring conveyor; wherein said headliner comprises:
        i) woven fabric;
        ii) foam;
        iii) nonwoven fabric; and
        iv) adhesive;
    c) controlling additions of a binder to said weight measuring conveyor carrying said ground components, wherein said binder comprises:
        i) a first blend of polyester/polyethylene fibers having a specific gravity of from about 0.91 g/cm$^3$ to about 0.97 g/cm³ and comprising from about 30% w/w to about 70% w/w of said binder; and ii) a second blend of polypropylene/polyethylene fibers having a specific gravity of from about 0.92 g/cm³ to about 0.94 g/cm³ and comprising from about 30% w/w to about 70% w/w of said binder;

d) mixing said binder and said ground components to create a bondable mixture such that said bondable mixture comprises from about 20% w/w to about 30% w/w of said binder;

e) depositing said bondable mixture onto a polyester scrim carried by a conveyor, wherein said bondable mixture's depth is from about 25 millimeters to about 100 millimeters and said bondable mixture's width is from about 1.20 meters to about 2.45 meters;

f) applying a first heat and a first pressure to said polyester scrim and said bondable mixture to create a first bonded mixture, wherein said first heat is in the range of about 175° C. to about 250° C.;

g) depositing a polypropylene scrim onto an upper side of said first bonded mixture;

h) applying a second heat and a second pressure to said polyester scrim, said polypropylene scrim and said first bonded mixture to create a second bonded mixture, wherein said second heat is in the range of about 175° C. to about 250° C.; and i) allowing said second bonded mixture to cool to create a rigid bonded composite having a thickness in the range of from about 2 millimeters to about 5 millimeters.

8. The process of claim 7, wherein said step of allowing said bonded mixture to cool to create a rigid bonded component having a thickness in the range of from about 2 millimeters to about 5 millimeters creates said rigid bonded composite weighing from about 1 kilogram to about 3 kilograms per square meter of surface area.

9. A process for recycling discarded headliner; comprising the steps of:

a) grinding said discarded headliner, thereby creating ground headliner;

b) sifting said ground headliner through a sieve having a mesh with diameters of from about 3 millimeters to about 5 millimeters and depositing said sifted and ground headliner on a weight measuring conveyor;

c) creating a shapeable mixture by controlling additions of a binder mixture to said weight measuring conveyor carrying said sifted and ground headliner such that said binder mixture comprises from about 20% w/w to about 30% w/w of said shapeable mixture;

d) transporting said shapeable mixture to a forced-air mixing chamber and mixing said sifted and ground headliner and said binder mixture;

e) positioning said shapeable mixture onto a polyester scrim carried by a conveyor, wherein said shapeable mixture's depth is from about 25 millimeters to about 100 millimeters and said shapeable mixture's width is from about 1.20 meters to about 2.45 meters;

f) applying a first heat and a first pressure to said polyester scrim and said shapeable mixture to create a first bonded mixture, wherein said first heat is in the range of about 175° C. to about 250° C.;

g) depositing a polypropylene scrim onto an upper side of said first bonded mixture;

h) applying a second heat and a second pressure to said polyester scrim, said polypropylene scrim and said first bonded mixture to create a second bonded mixture, wherein:

i) said second heat is in the range of about 175° C. to about 250° C., and wherein; and ii) adequate said binder mixture is melted to form said second bonded mixture consisting of said binder mixture and said scrims and said sifted and ground headliner, wherein a majority of said scrims and said sifted and ground headliner remains unmelted; and i) allowing said second bonded mixture to cool to create a rigid bonded composite having a thickness in the range of from about 2 millimeters to about 5 millimeters, and wherein said thickness having a surface area of 1 meter² weighs from about 1 kilogram to about 3 kilograms.

10. The process of claim 9 further comprising the step manufacturing said binding mixture to comprise a combination of meltable synthetic fibers.

11. The process of claim 10 wherein said combination of meltable synthetic fibers comprises:

i) polyester;
ii) polyethylene; and
iii) polypropylene.

12. The process of claim 11 further comprising the step of creating said combination of metltable synthetic fibers by blending a first group of polyester/polyethylene fibers having a specific gravity of from about 0.91 g/cm³ to about 0.97 g/cm³ with a second group of polypropylene/polyethylene fibers having a specific gravity of from about 0.92 g/cm³ to about 0.94 g/cm³ such that said first group comprises from about 30% w/w to about 70% w/w of said binder mixture and that said second group comprises from about 30% w/w to about 70% w/w of said binder mixture.

13. The process of claim 12 wherein said step of grinding said discarded headliner generates fluffy ground headliner.

14. A process of transforming unused or recycled headliner into a usable rigid component for a motor vehicle; comprising the steps of:

a) grinding said headliner to create fluffy components;

b) mixing said fluffy components with a composite binder to create a bondable mixture, wherein said bondable mixture comprises 30% w/w or less of said composite binder, and wherein said composite binder comprises:

i) a first blend of polyester/polyethylene fibers having a specific gravity of from about 0.91 g/cm³ to about 0.97 g/cm³ and comprising from about 30% w/w to about 70% w/w of said binder; and ii) a second blend of polypropylene/polyethylene fibers having a specific gravity of from about 0.92 g/cm³ to about 0.94 g/cm³ and comprising from about 30% w/w to about 70% w/w of said binder;

c) depositing said bondable mixture onto a first bondable layer;

d) covering said bondable mixture with a second bondable layer;

e) bonding said composite binder to said fluffy components and said first and second bondable layers such that said composite binder but not said fluffy components or said first and second bondable layers melt; and f) allowing said melted composite binder, said fluffy components and said first and second bondable layers to cool to create a rigid bonded composite for use in said motor vehicle.

15. The process of claim 14 wherein said step of bonding said composite binder to said fluffy components and said first and second bondable layers such that said composite binder but not said fluffy components or said first and second bondable layers melt further comprises the steps of:

a) applying heat in the range of about 175° C. to about 250° C.; and b) applying pressure to said composite binder, said fluffy components and said first and second bondable layers such that said rigid bonded composite has a thickness of from about 2 millimeters to about 5 millimeters.

16. The process of claim 15 further comprising the step of sifting said fluffy components through a sieve having a mesh with diameters of from about 3 millimeters to about 5 millimeters.

17. The process of claim 16, wherein said first and second bondable layers consist essentially of polyester or polypropylene.

18. The process of claim 17 wherein rigid bonded composite weighs from about 1 kilogram to about 3 kilograms per square meter of surface area.

* * * * *